United States Patent [19] [11] 3,845,400
Yee [45] Oct. 29, 1974

[54] SIGNAL ANALYZING APPARATUS

[75] Inventor: Ying S. Yee, Rochester, N.Y.

[73] Assignee: Eastman Kodak Company, Rochester, N.Y.

[22] Filed: Oct. 18, 1973

[21] Appl. No.: 407,741

Related U.S. Application Data

[62] Division of Ser. No. 324,630, Jan. 18, 1973, Pat. No. 3,807,877.

[52] U.S. Cl................. 328/151, 328/117, 328/147, 250/209
[51] Int. Cl...................... H03k 5/20, H03k 17/30
[58] Field of Search .......... 328/115, 116, 117, 146, 328/147, 148, 168, 151, 173, 175; 250/209, 578, 207

[56] References Cited
UNITED STATES PATENTS

| 3,252,099 | 5/1966 | Dodd | 328/151 X |
| 3,473,131 | 10/1969 | Perkins | 328/117 X |
| 3,541,320 | 11/1970 | Beall | 328/151 X |
| 3,585,507 | 6/1971 | Bickel | 328/147 X |
| 3,653,014 | 3/1972 | List et al. | 250/209 X |
| 3,714,441 | 1/1973 | Kreda | 250/207 |

Primary Examiner—John S. Heyman
Attorney, Agent, or Firm—G. E. Grosser

[57] ABSTRACT

A photometer is disclosed in which the light transmitted by reference and sample substances is alternately sampled to obtain an output voltage representing the sample density and the photometer sensitivity is varied as a function of this output voltage during the sampling of light transmitted by the sample substance.

5 Claims, 3 Drawing Figures

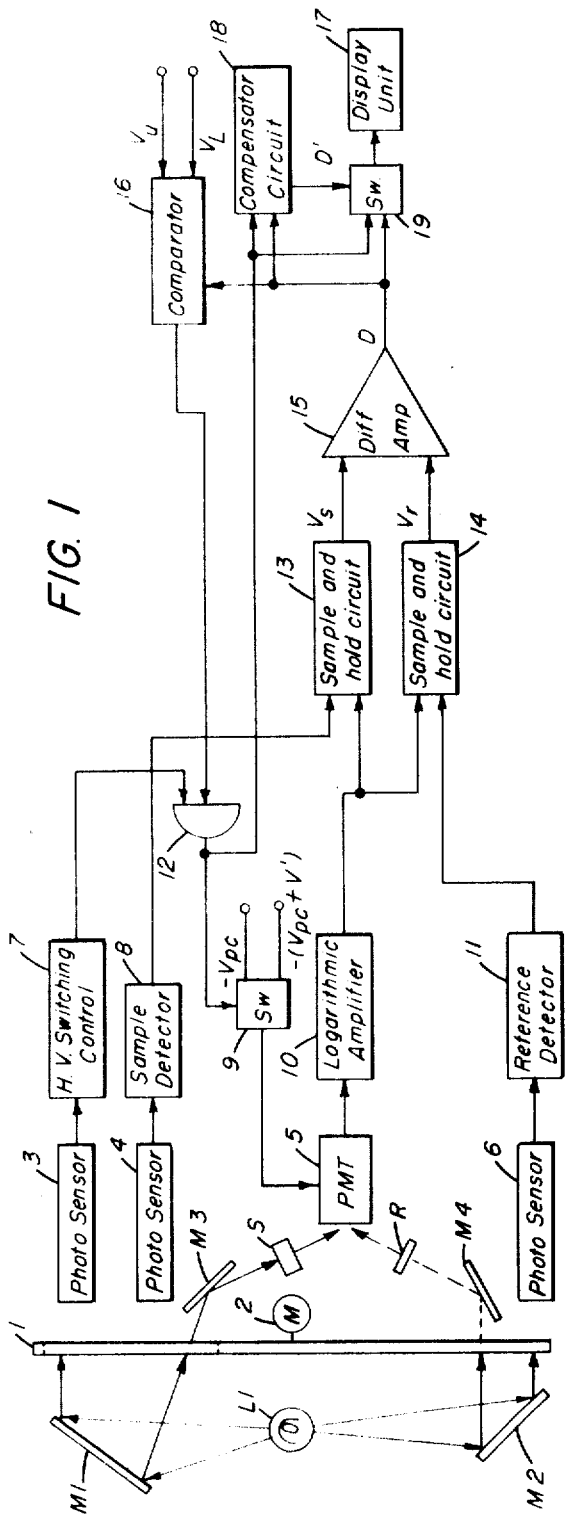
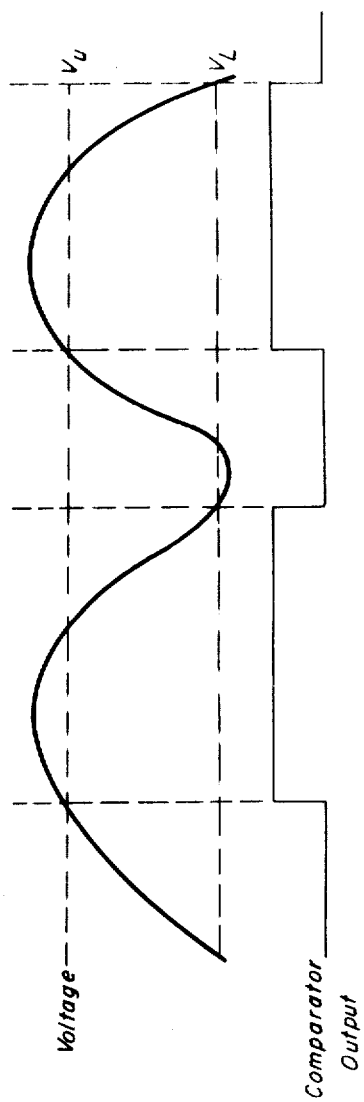
FIG. 1
FIG. 2

3,845,400

SIGNAL ANALYZING APPARATUS

This is a divisional of application Ser. No. 324,630, filed on Jan. 18, 1973. now U.S. Pat. No. 3,807,877.

BACKGROUND OF THE INVENTION

1. Field of the Invention

This invention relates to apparatus for determining optical characteristics of different substances and, more particularly, to a photometer in which sensitivity to light signals transmitted from a substance being analyzed is automatically varied as a function of the light signal strength.

2. Description of the Prior Art

It is well known in the prior art to measure the optical density of a sample substance by irradiating one surface of the substance with light, measuring the amount of light passing through, or reflected from, the substance, and comparing the measured light with the amount of light received from a reference substance. The difference between the intensity of the measured light and the intensity of the light received from the reference substance is related to the density of the sample substance. This general concept is commonly embodied in, among other things, densitometers that are used in analyzing the characteristics of photographic film. For instance, the density of a developed test film, exposed under controlled conditions, may be compared with the density of a developed reference film to determine either the optical density or contrast characteristics of the test film.

One type of apparatus use in measuring the light transmitted by both a sample substance and a reference substance employs a common light source, a chopper, a common photomultiplier tube and a number of common circuits. The apparatus converts detected light signals received from the reference and the sample into voltages and determines the difference in magnitude of the voltages to obtain an output voltage related to the density of the sample. In this type of system, the operation of the chopper results in the light transmitted through a sample substance and a reference substance being applied alternately to the common photomultiplier tube and circuits. This type of system is desirable since the effects of errors introduced by changes in the operating characteristics of the system components are minimized due to the time sharing of these components. In essence, a system of this type is more stable and, hence, provides more accurate measurements over a period of time than systems that use different components to perform measurements of the amount of light transmitted by a sample and reference substance. While a system of the type described above operates well when the difference in the density of the sample substance being analyzed and the reference substance is not too great, a problem arises when the difference in density reaches a certain magnitude. For example, when the sample substance is very dense, and transmits very little light, and the reference substance has a relatively low density, and transmits a substantial amount of light, the accuracy of the system may decrease. This decrease in accuracy can result from attempting to operate the system at a sensitivity level that allows the bright light transmitted by the reference to be applied to the photomultiplier tube, without damaging the tube, while at the same time allowing the low intensity light transmitted by the sample to be detected under conditions where the signal-to-noise ratio is very low. Operating a system at such a sensitivity level is obviously a compromise that can seriously effect the accuracy of the measured density under certain conditions.

Attempts have been made in the prior art to provide automatic control of the sensitivity of signal analyzing systems. One approach has been to vary the gain of the photoconductive detector as a function of the light transmitted by a reference source. A system implementing this concept is shown in G. J. Hecht et al., U.S. Pat. No. 3,089,382, issued May 13, 1963. While the Hecht system provides for some automatic control of its sensitivity, it does not allow the sample signal to be processed at one sensitivity level of the system and the reference signal to be processed on another sensitivity level. Basically, the Hecht system automatically selects a compromise level of sensitivity that is a function of the reference signal intensity, in a manner similar to that previously mentioned, at which both the sample signal and the reference signal are processed. Hence, this system does not provide the automatic sensitivity level changing required to accurately process sample signals and reference signals when a sample substance is much more dense than the reference substance.

In essence, the prior art shows circuits for automatically determining a level of system sensitivity, as a function of reference signal intensity, at which both sample and reference signals are processed but it does not show circuits for automatically determining different sensitivity levels, as a function of the sample signal intensity, at which to process sample and reference signals.

SUMMARY OF THE INVENTION

The invention overcomes the problems of the prior art by utilizing a fixed sensitivity level to detect reference signals and by automatically selecting a sensitivty level that is a function of sample signal intensity to detect sample signals. In general, the density of a reference substance used in a signal analyzing system, such as a photometer, is within the medium range of densities to be analyzed and a system sensitivity level may be readily selected for detecting the substantially constant intensity light signals transmitted through the reference substance. The sample substance density, on the other hand, generally is an unknown that can vary significantly from one test to another and it is difficult, if not impossible, to select a single sensitivity level for detecting the reference signals which, when used for detecting sample signals, will yield accurate results for samples having a wide range of densities. While the ability to change sensitivity levels is desirable in the foregoing situation, there are also situations where sample substance densities are sufficiently near the reference substance density that a single system sensitivity level can be used for detecting both sample and reference signals and accurate results will be obtained. Consequently, in accordance with the invention, the operating parameters of a signal analyzing system are selected so that the system sensitivity is sufficient to process both the signals transmitted by a reference substance and the signals transmitted by sample substances with densities that do not differ from the reference substance density by more than a predetermined amount. When the sample substances are encountered that have densities differing from the reference substance density by more than this predetermined amount, selected operating parameters of the system are automatically altered, during the interval the sample signal is applied to the system, to alter the system's sensitivity and, thus, insure that the magnitude of the sample signal is accurately detected. After such a sample signal has been processed, the operating parameters of the system are automatically restored to their original values selected for processing the stronger signals transmitted by the reference substance.

More specifically, the invention may be implemented in such a way that during the processing of a signal transmitted by a sample substance whose density does not vary from the reference density by more than a predetermined difference, the voltage $-V_{pc}$ applied to the cathode of a photoconductive element in the system is the same as when a reference signal is being processed. In the situation where the sample is very dense, resulting in the difference in density between the sample and the reference exceeding the predetermined difference, the voltage applied to the cathode of the photoconductive element in the system is changed to $-(V_{pc} + V')$ during the processing of the sample signal. In this case, the sensitivity of the system is increased to insure that the relatively weak sample signal is detected as a signal rather than being lost in noise. Alternatively, the foregoing change in system sensitivity can be achieved by altering the operating parameters of any other component in the system that results in a better signal-to-noise ratio in such a system. In summary, the invention controls the sensitivity of a signal analyzing system that is responsive to sample and reference signals by automatically varying selected operating parameters of the system's circuitry as a function of the intensity of the sample signals when these signals are being processed.

The advantages of the invention are apparent. It eliminates the need for manual adjustment of a signal analyzing system to insure that large variations in sample and reference substance densities do not result in an inaccurate density determination for the sample substance. By automating the sensitivity control in such a system, both the system efficiency and accuracy are increased since the time required for manual sensitivity adjustment and the possibility of failing to properly adjust the sensitivity are eliminated. Finally, automatically changing the operating parameters of the system's circuitry as a function of input signal strength reduces the possibility of damaging expensive components in the system, such as the photomultiplier tube, due to overloading these components with a strong reference signal when the system parameters are set at a level for processing weak sample signals.

OBJECTS OF THE INVENTION

It is an object of the invention to increase the accuracy of signal analyzing systems responsive to variable sample signals and substantially constant reference signals.

It is another object of the invention to reduce the possibility of damaging components in a system used in determining optical characteristics as a result of overloading system components with a strong input signal when their operating parameters are set at a level for processing weak signals.

It is yet another object of the invention to facilitate the use of a system for determining optical density with a set of sample substances that vary widely in density by automatically varying the sensitivity of the system as a function of the density of each substance.

DESCRIPTION OF THE DRAWINGS

FIG. 1 shows a block diagram of a photometer that implements the invention.

FIG. 2 shows waveforms useful in describing the operation of a comparator shown in the illustrative embodiment in FIG. 1.

DESCRIPTION OF THE ILLUSTRATIVE EMBODIMENT

Figure 3:
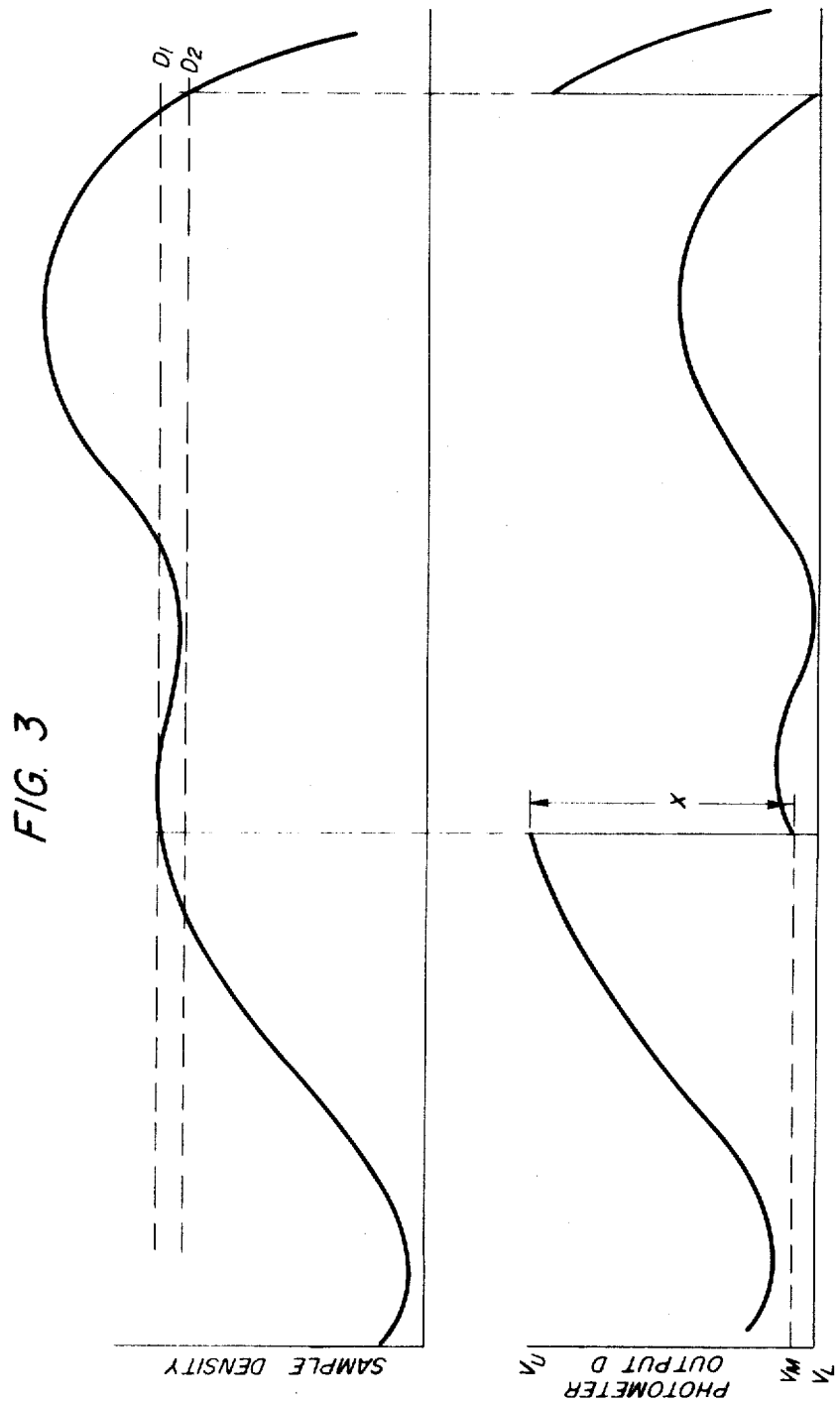
FIG. 3 shows waveforms that illustrate the relationship of a set of sample densities and the output of the photometer.

In the photometer shown in FIG. 1, a common light source $L_1$ is used to alternately illuminate a sample substance S and a reference substance R. For purposes of discussion, it will be assumed that these substances are pieces of developed photographic film. When the difference between the density of the sample film S and the reference R is less than the previously mentioned predetermined difference, the operation of the photometer is similar to the operation of the liquid analyzing system described in the G. J. Hecht et al. patent. In essence, a chopper 1 (FIG. 1) is driven by a motor 2 and, as the chopper rotates, light emitted by a source $L_1$ alternately traverses the paths defined by mirrors $M_1$, $M_3$ and $M_2$, $M_4$. It will be noted that when light traverses the path defined by the mirrors $M_1$, $M_3$, it passes through the sample film S prior to striking a photomultiplier tube 5. Additionally, at the time light is passing through the sample S, it is also striking photosensors 3 and 4. The photosensor 4 responds to this illumination by generating a signal that is amplified and shaped by a sample detector 8 and then used to enable a sample and hold circuit 13. The sample and hold circuit 13 is used to store a voltage generated by processing the light transmitted through the sample S that is a function of the density of the sample. Simultaneously, the photomultipler tube responds to the light transmitted through the sample S by generating a current that is applied to a logarithmic amplifier 10. The logarithmic amplifier 10 responds to this input by generating an output voltage that is applied to the enabled sample and hold circuit 13. It will be noted that at the same time the foregoing operations are being performed, the photosensor 3 is also illuminated. This photosensor is part of the circuit used to alter the sensitivity of the photometer as a function of the sample signal intensity. Since it has been assumed that the density of the sample S is not sufficient to warrant a change in photometer sensitivity, the output of this photosensor 3 will not affect the operation of the photometer at this time. Operations similar to those described in discussing the processing of the light transmitted by the sample S are performed when the chopper 1 is rotated to a point where a photosensor 6 is illuminated. A reference detector 11 responds to the output of the photosensor 6 by generating a signal that enables a sample and hold circuit 14 used to store a voltage that is a function of the density of the reference material R. The photomultiplier tube 5 responds to the light transmitted through the reference R by generating a signal that is applied to the logarithmic amplifier 10 which responds by applying a voltage to the sample and hold circuit 14 for storage.

The outputs of the sample and hold circuits 13, 14 (FIG. 1) are both applied to a differential amplifier that subtracts the voltage $V_S$ representing the light transmitted through the Sample S from the voltage $V_R$ representing the light transmitted through the reference R to obtain a difference voltage D representing the density of the sample S. This difference voltage D is applied to a display unit 17 via a switch 19 and the display unit converts the difference voltage into a visual reading representing the density of the sample S film.

When the difference in densities of the sample S (FIG. 1) and reference R exceeds the previously mentioned predetermined difference, the sensitivity of the photometer to sample signals is increased by increasing the negative voltage applied to the cathode of the photomultiplier tube 5. In this case, the output of the photosensor 3 enables circuitry in the photometer that generates a signal resulting in the change in photomultiplier tube cathode voltage during the time the sample signal is being processed as described above. More specifically, when the chopper 1 allows light to illuminate a sample S having the above-described density, the photosensor 3 generates a signal that results in the high voltage switching control 7 applying a "1" signal to one input of an AND gate 12 during the processing of the sample signal. This signal is a timing signal that allows the gate 12 to be enabled only when sample signals are being processed. The other input to this gate is obtained from a comparator 16 which generates a signal "1" when the voltage output D of the differential amplifier 15 indicates that the difference between the densities of the sample and reference exceeds the previously mentioned predetermined difference. Since it has been assumed that this condition exists, the output of the comparator 16 will be a "1" when the "1" output of the high voltage switching control 7 is applied to the gate 12. As a result of the simultaneous application of "1" to both inputs of the gate 12, the gate is enabled and a "1" is applied to a switch 9 controlling the voltage applied to the cathode of the photomultiplier tube 5. The switch 9 responds to the application of this signal by increasing the negative voltage applied to the cathode of the photomultiplier tube 5 from $-V_{pc}$ to $-(V_{pc} + V')$, resulting in an increase of the photomultiplier tube sensitivity to the low level of light being transmitted through the dense sample S.

When the duration during which the sample signal is processed ends, the output of the high voltage switching control 7 changes from a "1" to "0," resulting in the gate 12 being disabled. At this point, the output of the gate 12 changes from a "1" to a "0" and the switch 9 responds by decreasing the negative voltage applied to the cathode of the photomultiplier tube 5 from $-(V_{pc} + V')$ to $-V_{pc}$ in preparation for processing the more intense light transmitted through the reference R.

The waveforms in FIG. 2, which illustrate the relationship between the output of the comparator 16 (FIG. 1) and a voltage waveform representing a distribution of sample densities, are useful in describing the comparator's operation. When the input voltage of the comparator is less than $V_t$ volts, the comparator 16 output is a "0." If this input voltage rises until it reaches an amplitude equal to or exceeding $V_t$, the comparator output becomes a "1." The output of the comparator 16 will remain a "1" until the amplitude of the voltage at its input decreases to the point where it is less than or equal to $V_L$. At this point, the output of the comparator 16 is returned to a "0."

The waveforms in FIG. 3 illustrate the relationship between a set of sample densities and the output D of the differential amplifier 15 (FIG. 1). When the density of a sample in the set of samples being analyzed equals D1, a sample density at which the difference between the sample and reference density exceeds the previously mentioned predetermined difference, the output of the differential amplifier 15 becomes $D = V_t$. This output is applied as an input to the comparator 16. It will be recalled that when the input of the comparator 16 equals $V_t$, the output of the comparator becomes a "1" and this results in the negative voltage applied to the cathode of the photomultiplier tube 5 being changed from $-V_{pc}$ to $-(V_{pc} + V')$. This increase in negative cathode potential increases the photomultiplier tube sensitivity during the processing of sample signals and results in a reduction in the difference between the sample $V_S$ and reference $V_R$ voltages, stored in the sample and hold circuits 13, 14, which are inputs to the differential amplifier 15. Hence, the output voltage D of a differential amplifier 15 drops to the level $V_M$, reflecting this reduction in the difference between the sample $V_S$ and reference $V_R$ voltages. In essence, this increase in photometer sensitivity scales down the output D of the photometer representing the density of the sample S. The photometer will continue to operate in this mode until the density of a sample being analyzed equals D2. At this point, the difference between densities of the sample S and reference R is such that the output D of the differential amplifier 15, which is applied as an input to the comparator 16, is equal to $V_L$. As previously mentioned, reducing the comparator 16 input to $V_L$ results in the comparator 16 switching its output from a "1" to a "0," and this results in sample signals being processed at the same photometer sensitivity level as reference signals. Consequently, the difference between the sample $V_S$ and reference $V_R$ voltages increases and the output D of the differential amplifier increases. Essentially, these operations scale up the output of the photometer when the difference in densities between the samples and references are less than the predetermined differences.

Since applying a more negative voltage to the cathode of the photomultiplier tube 5 (FIG. 1) increases its gain, it is necessary to correct for this increased gain when a sample signal has been processed while the more negative voltage $-(V_{pc} + V')$ is applied to the photomultiplier tube. It will be recalled that the more negative voltage is applied to the photomultiplier tube cathode only when the gate 12 is enabled. Consequently, the "1" output of the gate can also be used to indicate when a sample signal is being processed during the interval the photomultiplier tube cathode voltage is at the level $-(V_{pc} + V')$ and correction is required to obtain an accurate density reading on the display 17.

This correction is accomplished by using the output of gate 12 (FIG. 1) to enable a compensator circuit 18 which increases the output D of the photometer by the amount that D was reduced as a result of the increased gain of the photomultiplier tube 5 during the processing of the sample signal. It will be recalled that the output D is the difference between the voltages stored in the sample and hold circuits 13, 14 as a result of processing reference and sample signals. Increasing that gain during the processing of sample signals results in a decrease in the difference voltage D and this decrease must be corrected to obtain an accurate density reading. The output of gate 12 also enables a switch 19 that applies the increased photometer output D' to the display device 17 instead of the photometer's uncorrected output D. More specifically, if the increased gain of the photometer results in the difference between the two voltages stored in the sample and hold circuits 13, 14 being reduced by $x$ (FIG. 3) volts, the compensator circuit 19 will correct the photometer output voltage D by adding $x$ to it and applying the voltage $D' = D + x$ to the display 17.

In essence, the foregoing has described an illustrative embodiment of the invention in which the high voltage applied to the cathode of a photomultiplier tube is varied as a function of the sample signal light intensity applied to the photomultiplier tube. While the illustrative embodiment is a photometer, it is clear that the invention is useful in any circuit in which it is desirable to alter the sensitivity of a sampling device as a function of sampled input signals with magnitudes that are unknown. Similarly, it is apparent that circuit parameters other than photomultiplier tube cathode voltage can be altered to accomplish the objects of the invention. Furthermore, while the use of only two high voltage values, $-V_{pc}$ and $-(V_{pc} + V')$, was described in connection with the illustrative embodiment, it is clear that more than two voltage levels can be used where required by operating conditions.

In view of the foregoing it is clear that numerous modifications and adaptations of the illustrative embodiment within the spirit and scope of the invention will be obvious to one skilled in the art upon reading this disclosure.

I claim:

1. In a system for analyzing a variable signal of unknown magnitude received from a source, the combination comrpising; comprising;

a substantially constant reference signal;
    means for alternately sampling said variable signal and said reference signal repetitively;
    means for generating an output voltage representing the difference in magnitude between said variable signal and said reference signal;
    sensitivity control means responsive to said output voltage of a selected amplitude for altering the system sensitivity from a first level to a second level during the next sample of said variable signal; and means for converting said output voltage into data representing a characteristic of said source.

2. The system of claim 1 wherein said sensitivity control means returns said system sensitivity to said first level during a sample of said reference signal.

3. The system of claim 1 wherein said sensitivity control means further comprises;
    means for generating a timing signal indicating the interval during which said variable signal is sampled; and
    means responsive to said timing signal and said output voltage of a selected amplitude for increasing said system sensitivity during said interval.

4. The system of claim 3 wherein said means responsive to said timing signal and said output voltage further comprises;
    a comparator for generating a first sensitivity control signal when the amplitude of said output voltage is greater than or equal to a first threshold voltage; and
    circuit means responsive to said timing signal and said first sensitivity control signal for increasing said system sensitivity from a first level to a second level during said interval in which said variable signal is sampled.

5. The system of claim 4 wherein said comparator generates a second sensitivity control signal when the amplitude of said output voltage is less than or equal to a second threshold voltage; and
    said circuit means is responsive to said timing signal and second sensitivity control signal for maintaining said system sensitivity at said first level during a sample of said variable signal.

* * * * *